UNITED STATES PATENT OFFICE.

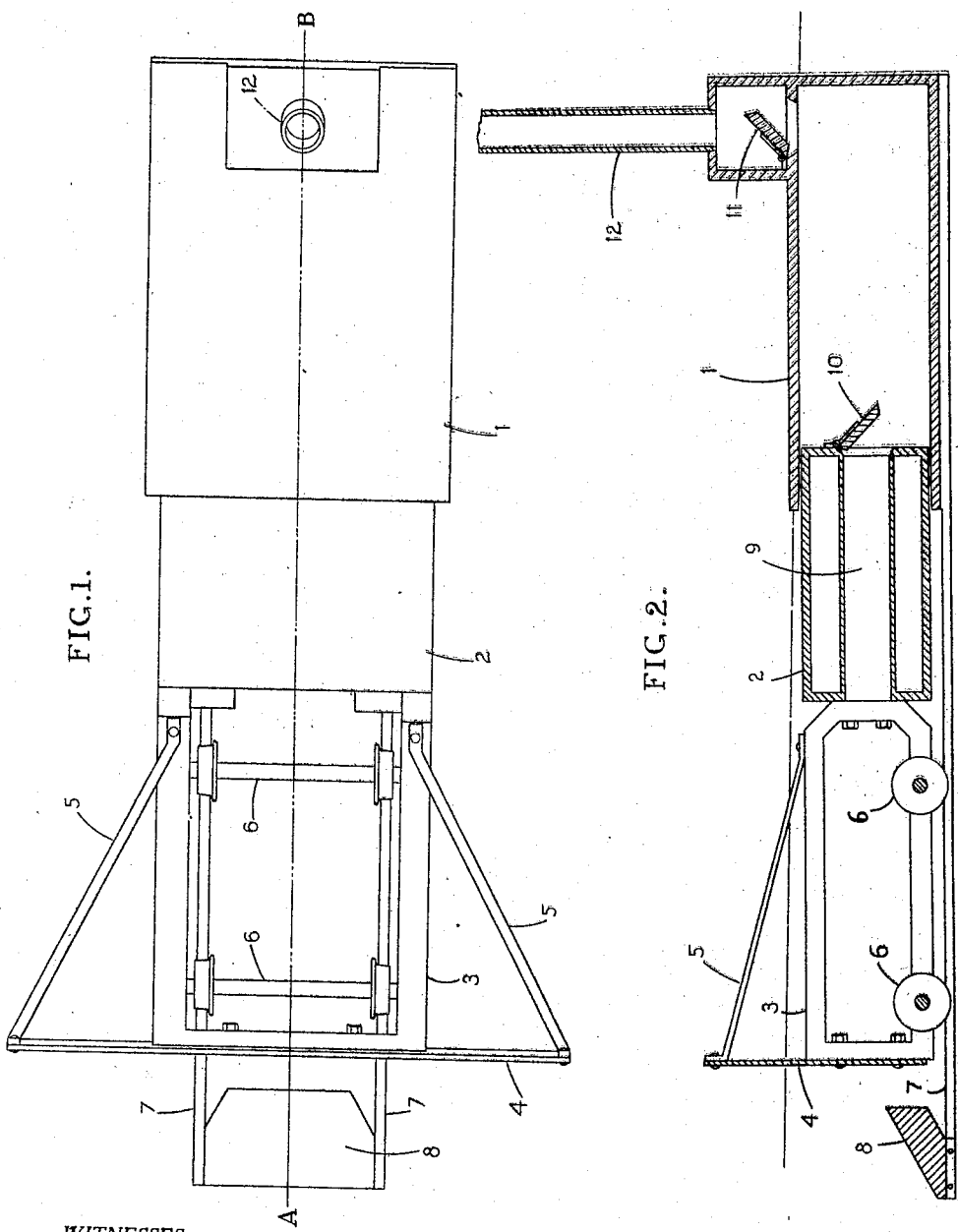

JOHN LEVERING MATTHEWS, OF SAN DIEGO, CALIFORNIA.

WAVE-MOTOR.

938,681.

Specification of Letters Patent. Patented Nov. 2, 1909.

Application filed May 7, 1909. Serial No. 494,716.

*To all whom it may concern:*

Be it known that I, JOHN LEVERING MATTHEWS, citizen of the United States, residing at San Diego, in the county of San Diego and State of California, have invented certain new and useful Improvements in Wave-Motors; and I do hereby declare the following to be a full, clear, and exact description of the invention, such as will enable others skilled in the art to which it appertains to make and use the same.

This invention relates to wave motor apparatuses for use in connection with the motion of the tide and waves of the surf and has for its object the provision of improved means for operating a plurality of pistons to force water to an elevated height sufficient to be used as power for driving turbines or other machinery for the purpose of developing power to generate electricity or for other purposes.

Further objects and advantages of the invention will be set forth in the detailed description which now follows.

In the accompanying drawing Figure 1 is a top plan view and Fig. 2 a vertical and sectional view on line A-B Fig. 1.

Referring to the drawing the numeral 1 designates the casing or cylinder constructed shell in which the piston works back and forth in conjunction with frame 3 which is made fast to the piston 2 and provided with plate 4, supported by braces 5 to frame 3, and resting on wheels 6, that travels on rails , all of which are intended to be forced back and forth by the breakers or motion of the waves of the surf. The travel rear or outward of the piston and frame is governed by a stop 8 made fast to the rails on each side. The forward motion of the wave is intended to be used to drive the piston forward which closes valve 10 and opens valve 11. The recoil or back motion of the wave intended to be used to draw the frame containing the piston back, which provides means for refilling the cylinder and which forces the water to a given elevation through pipe 12. It will of course, be understood that this machine is to be placed near the shore and partly under water and that the machine may be kept constantly in motion by the power of the surf.

In addition to providing means for operating a device for lifting water to a given height, I desire to provide means for driving water wheels, turbines, and all machinery of like character by the use of water retained in artificial lakes or reservoirs, transmitted to sufficient height to furnish power to operate said wheels or turbines for the purpose of generating electricity or other purposes for which power is needed.

From the foregoing description it will be seen that simple and efficient means are herein provided for accomplishing the objects of the invention. But while the elements shown and described are well adapted to serve the purpose for which they are intended to be used, it is to be understood that the invention is not limited to the precise construction set forth, but includes with its purview such changes as may be made within the scope of the appended claim.

Having thus described my invention, what I claim is—

In a device of the character described the combination with a cylinder provided with a lifting valve and discharge pipe, of a piston adapted to work inside of said cylinder having a valve arranged to open and close freely with the motion of the surf, said piston being connected to a movable frame which is provided with wheels and a large plate in wing shape, which is adapted to resist the power of the surf and force the piston back and forth in the cylinder and stop to limit the movement of said frame, substantially as shown and for the purpose specified.

In testimony whereof, I affix my signature, in presence of two witnesses.

JOHN LEVERING MATTHEWS.

Witnesses:
 FRED M. KEENEY,
 G. CONNORS.